United States Patent [19]
Mäenpää

[11] Patent Number: 5,978,687
[45] Date of Patent: Nov. 2, 1999

[54] METHOD FOR ESTABLISHING A CALL IN A CELLULAR RADIO SYSTEM DEPENDING ON WHETHER THE A PBX IS THE HOME PBX OF THE REQUESTING MOBILE SUBSCRIBER

[75] Inventor: Sanna Mäenpää, Espoo, Finland

[73] Assignee: Nokia Telecommunications Oy, Espoo, Finland

[21] Appl. No.: 08/577,512

[22] PCT Filed: Jun. 16, 1994

[86] PCT No.: PCT/FI94/00266

§ 371 Date: Dec. 22, 1995

§ 102(e) Date: Dec. 22, 1995

[87] PCT Pub. No.: WO95/01075

PCT Pub. Date: Jan. 5, 1995

[30] Foreign Application Priority Data

Jun. 23, 1993 [FI] Finland ..................................... 932921

[51] Int. Cl.⁶ ........................................................ H04Q 7/26
[52] U.S. Cl. ........................... 455/555; 455/465; 455/461; 455/414
[58] Field of Search ..................................... 455/555, 554, 455/433, 465, 463, 414, 461

[56] References Cited

U.S. PATENT DOCUMENTS 5,210,786  5/1993  Itoh .

FOREIGN PATENT DOCUMENTS

| 0 454 647 | 10/1991 | European Pat. Off. . |
| 0 462 728 | 12/1991 | European Pat. Off. . |
| 0 512 962 | 11/1992 | European Pat. Off. . |
| 0 544 446 | 6/1993  | European Pat. Off. . |
| 925383    | 5/1993  | Finland . |
| 92/22174  | 12/1992 | WIPO . |

*Primary Examiner*—Dwayne D. Bost
*Assistant Examiner*—Linwood C. Scott, Jr.
*Attorney, Agent, or Firm*—IP Group of Pillsbury Madison & Sutro LLP

[57] ABSTRACT

A method for call establishment in a cellular radio system including a mobile services switching center and a private branch exchange connected thereto, and a visitor location register for storing subscriber data on subscribers located within the service area of the mobile services switching center. To optimize call establishment, when the private branch exchange receives a connection establishment request from a subscriber located within its service area, the private branch exchange checks whether the private branch exchange is the home private branch exchange of the subscriber that sent the connection establishment request. If the private branch exchange is the home private branch exchange of the subscriber, the private branch exchange performs independently authentication, activation of ciphering procedures and assignment of a temporary subscriber identity and only thereafter sends a connection establishment request to the mobile services switching center. If the first call-related message sent by the private branch exchange to the mobile services switching center is a connection establishment request instead of a service request, the mobile services switching center initiates connection establishment without an interrogation to the visitor location register.

4 Claims, 2 Drawing Sheets

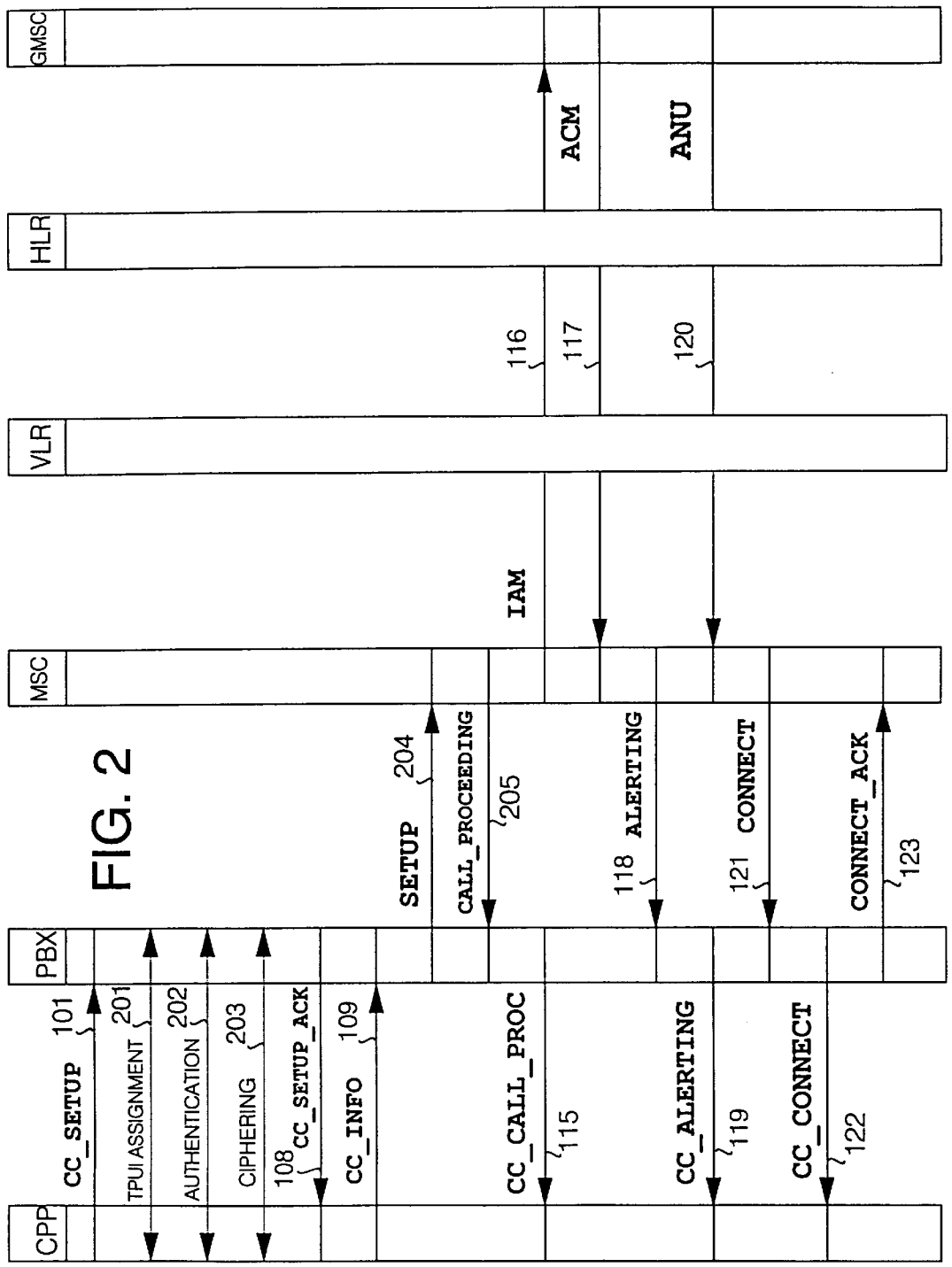

METHOD FOR ESTABLISHING A CALL IN A CELLULAR RADIO SYSTEM DEPENDING ON WHETHER THE A PBX IS THE HOME PBX OF THE REQUESTING MOBILE SUBSCRIBER

This application claims benefit of international application PCT/F194/00266, filed Jun. 16, 1994.

FIELD OF THE INVENTION

The invention relates to a method for call establishment in a cellular radio system comprising a mobile services switching centre and a private branch exchange connected thereto, and a visitor location register for storing subscriber data on subscribers located within the service area of the mobile services switching centre. In particular, the invention pertains to a case where a subscriber located within the service area of a home private branch exchange wishes to make a call through the mobile services switching centre.

BACKGROUND OF THE INVENTION

Various cellular radio systems or mobile telephone systems are in use and presently being designed in which the geographical coverage area of the system is divided into smaller separate radio areas, i.e. cells, in such a way that when the radiotelephone or mobile telephone is located in a cell, it communicates with the fixed network through a fixed radio station incorporated in the cell. The mobile telephones belonging to the system can roam freely within the system area from one cell to another. One such system is the digital mobile telephone system GSM (Global System for Mobiles).

Cordless telephone (CT) systems, such as the DECT system, have recently come out on the market. The DECT system comprises a base station, which is normally based on access to an existing fixed telephone network. There are three main types of base stations: a residential base station, a base station connected to a private branch exchange in an office, and a telepoint base station.

Cordless telephone systems can also be connected to mobile telephone networks, for instance to the GSM system. The private branch exchange (PBX) of a cordless telephone system can be connected to the GSM system for example by employing DSS 1, Q.930-Q.940, 1989, Digital Subscriber Signalling System No. 1, Network Layer, User-Network Management, CCITT signalling supplemented with mobility management messages. The PBX of a cordless telephone system is connected to the switching centre of the GSM system so that the subscribers in the PBX can roam within the service area of the GSM system, and the subscribers in the PBX can make use of the mobility management procedures of the GSM system and roam within the service area of DECT systems associated with the GSM system. In such a case, mobile subscribers are attached to the PBX in accordance with the DECT radio path protocol ETS 300175, Radio Equipment and Systems (RES), Digital European Cordless Telecommunications (DECT), Common Interface, for instance. It has also been possible to connect fixed subscribers to the PBX, for example in accordance with the ISDN signalling protocol. In that event, calls originating from the GSM system or from a GSM-connected telephone network can also be routed to cordless, for instance DECT, subscribers located within the service area of the PBX.

In the prior art solution, wherein a subscriber located within the service area of a private branch exchange wishes to establish a connection, for example make a call or set up a telecommunications connection to another subscriber, register interrogation procedures in accordance with the GSM recommendations are performed, irrespective of the location of the called subscriber. FIG. 1 shows call establishment procedures in accordance with the prior art. In the figure, a subscriber CPP (Cordless Portable Part) in a private branch exchange PBX sends 101 a connection establishment request CC_SETUP, by way of which the subscriber requests the PBX to establish a connection, to another subscriber. Upon receipt of the connection establishment request CC_SETUP, the PBX sends 102 a service request DM_SERVICE_REQ to the mobile services switching centre MSC. Having received the service request, the MSC sends 103 an access request pertaining to mobility management, PROCESS_ACC_REQ, to the visitor location register VLR. The next step is the assignment of a temporary mobile subscriber identity TMSI_ASSIGNMENT 104. This is followed by authentication 105 of the subscriber. Authentication is a process wherewith the subscriber is identified as a legal user of the system. Subsequent to the authentication, ciphering 106 of the messages employed is activated. Further, the visitor location register VLR responds to the access request PROCESS_ACC_REQ by sending 107 an acknowledgement ACCESS_REQ_ACC. The PBX subsequently or simultaneously acknowledges the received CC_SETUP message by sending 108 an acknowledgement message CC_SETUP_ACK to the subscriber CPP. Having received an indication of a successful connection establishment request, the subscriber sends 109 the information needed for completing the connection, for example the subscriber number of the B-subscriber, to the private branch exchange PBX in a CC_INFO message. The PBX further transmits 110 this information and the connection establishment request as a SETUP message to the mobile services switching centre of the subscriber. The mobile services switching centre sends 112 a subscriber data check interrogation S_INFO_F_O/G_CALL to the visitor location register VLR, which checks the subscriber data in its subscriber database. When the visitor location register has checked the subscriber data, it sends 113 a COMPLETE_CALL message as an indication of a successful call to the mobile services switching centre MSC, which transmits 114 a CALL_PROC message to the private branch exchange PBX of the subscriber. The PBX transmits an indication of a successful call to the subscriber CPP by sending 115 a CC_CALL_PROC message. As a next step, the MSC sends 116 an indication of the receiving subscriber, the inbound call and the roaming number in an initial address message IAM (specified in the common channel signalling standard Q.721-Q.766, 1989, Specifications of Signalling System No. 7, CCITT, Vol. VI—Fascicle VI.8, p. 251) to the mobile services switching centre MSC of the location area of the receiving subscriber, which may also be a gateway mobile services switching centre GMSC. It is also to be noted that the receiving subscriber may be located within the service area of the mobile services switching centre MSC of the location area of the subscriber CPP requesting the connection, in which case the IAM message is sent as an internal routine of the mobile services switching centre. If the IAM message has been sent to a gateway mobile services switching centre GMSC, the GMSC sends 117 an ACM message (Address Complete Message) in response to the IAM message, thus indicating that all digits required for routing the call have been received. The mobile services switching centre MSC then sends 118 an ALERTING message to the private branch exchange PBX, which responds to the CC_SETUP message by sending 119 a CC_ALERTING message to the private branch exchange PBX. When the receiving subscriber, i.e. B-subscriber, answers the call, the gateway mobile services switching centre GMSC sends 120 an ANM message (Answer Message). Thereafter the mobile services switching centre sends 121 a CONNECT message to the private branch exchange PBX, which transmits 122 said message to the subscriber CPP as a CC_CONNECT message. The PBX acknowledges successful sending of the CONNECT message by sending 123 an acknowledgement message, CONNECT_ACK, to the mobile services switching centre.

It is apparent from the foregoing that establishment of a connection to a subscriber located within the service area of a private branch exchange connected to a cellular radio network is a complicated and cumbersome process. It should be noted that the prior art call establishment procedure as set forth above is to be performed every time a subscriber located within the service area of the private branch exchange wishes to establish a call or another telecommunications connection. The mobility management functions to be performed in the GSM system which form part of the operations for connection establishment, i.e. the subscriber authentication 105, ciphering 106 and TMSI assignment 104 and the PROC_ACCESS_REQ 103 and COMPLETE_CALL 113 messages to be sent, as described in the GSM 09.02 recommendation, considerably load the signalling capacity of the mobile telephone network. Heavy loading of the signalling capacity may lead to an overload and system failure, and naturally gives rise to unnecessary traffic in the network. It is further to be noted that the above connection establishment procedures and sending of the messages mentioned above load the network elements that transmit such messages. The processor capacity of the network elements is unnecessarily occupied and may be overloaded. Furthermore, the network elements receiving the messages must process them and perform the desired functions which again load further network elements that receive messages.

SUMMARY OF THE INVENTION

It is an object of the present invention to provide a method for call establishment avoiding the above problems when a call or telecommunications connection is to be established from a subscriber in a home private branch exchange through a mobile telephone network to a subscriber in the mobile telephone network or another telecommunications network having connection with said mobile telephone network. The object is to diminish unnecessary mobility management functions pertaining to connection establishment and sending of unnecessary signalling messages.

This novel method for call establishment is achieved in a manner according to the invention, which is characterized in that when the private branch exchange receives a connection establishment request from a subscriber located within its service area, it checks whether the private branch exchange is the home private branch exchange of the subscriber that sent the connection establishment request; if the private branch exchange is the home private branch exchange of the subscriber, the private branch exchange performs independently authentication, activation of ciphering procedures and assignment of a temporary subscriber identity and only thereafter sends a connection establishment request to the mobile services switching centre; if the first call-related message sent by the private branch exchange to the mobile services switching centre is a connection establishment request instead of a service request, the mobile services switching centre initiates connection establishment without an interrogation to the visitor location register.

The invention is based on the idea that when a subscriber located within the service area of its home private branch exchange wishes to make a call to another subscriber through the mobile telephone network, optimized signalling wherefrom unnecessary signalling and procedural steps are omitted is employed instead of normal GSM signalling. The call establishment according to the invention operates in such a way that when a subscriber in the private branch exchange wishes to establish a connection and sends a connection establishment request, the private branch exchange checks in its database whether the subscriber is a home subscriber in the private branch exchange. If the subscriber is located within the service area of its home private branch exchange, the private branch exchange performs the necessary subscriber mobility management functions independently within its own service area. Thereafter the private branch exchange sends a connection establishment request to the mobile services switching centre, which recognizes therefrom that the first message sent to it is a connection establishment request and not a service request and that the subscriber mobility management functions are to be omitted. In that connection, the mobile services switching centre also omits the register interrogation to the visitor location register. Thereafter the operation continues as described at the beginning of the specification.

It is an advantage of such an inventive call establishment method that it reduces internal signalling traffic, i.e. internal messages, in the mobile telephone system. Thus the load on the telecommunication connections between the network elements of the system is reduced and their risk of overload and likelihood of congestion is diminished.

A further advantage of the invention is the fact that it reduces the load on the network components of the mobile telephone network, such as the subscriber registers, and diminishes the likelihood of congestion and risk of overload on the system.

Still another advantage of the invention is the fact that the invention expedites connection establishment when a call is placed by a subscriber located within the service area of a private branch exchange connected to a mobile telephone network to a subscriber in the mobile telephone network or another telecommunications network having connection with said mobile telephone network. Connection establishment is expedited, since "unnecessary" mobility management functions and register interrogation to the visitor location register VLR are omitted from the establishment of the connection.

BRIEF DESCRIPTION OF THE DRAWINGS

The invention will now be set forth in greater detail with reference to the accompanying drawings, wherein:

FIG. 2 is a signalling diagram of connection establishment in accordance with the invention.

FIG. 1 has been explained at the beginning of the specification in connection with the description of the prior art.

DETAILED DESCRIPTION OF A PREFERRED EMBODIMENT OF THE INVENTION

Figure 1:
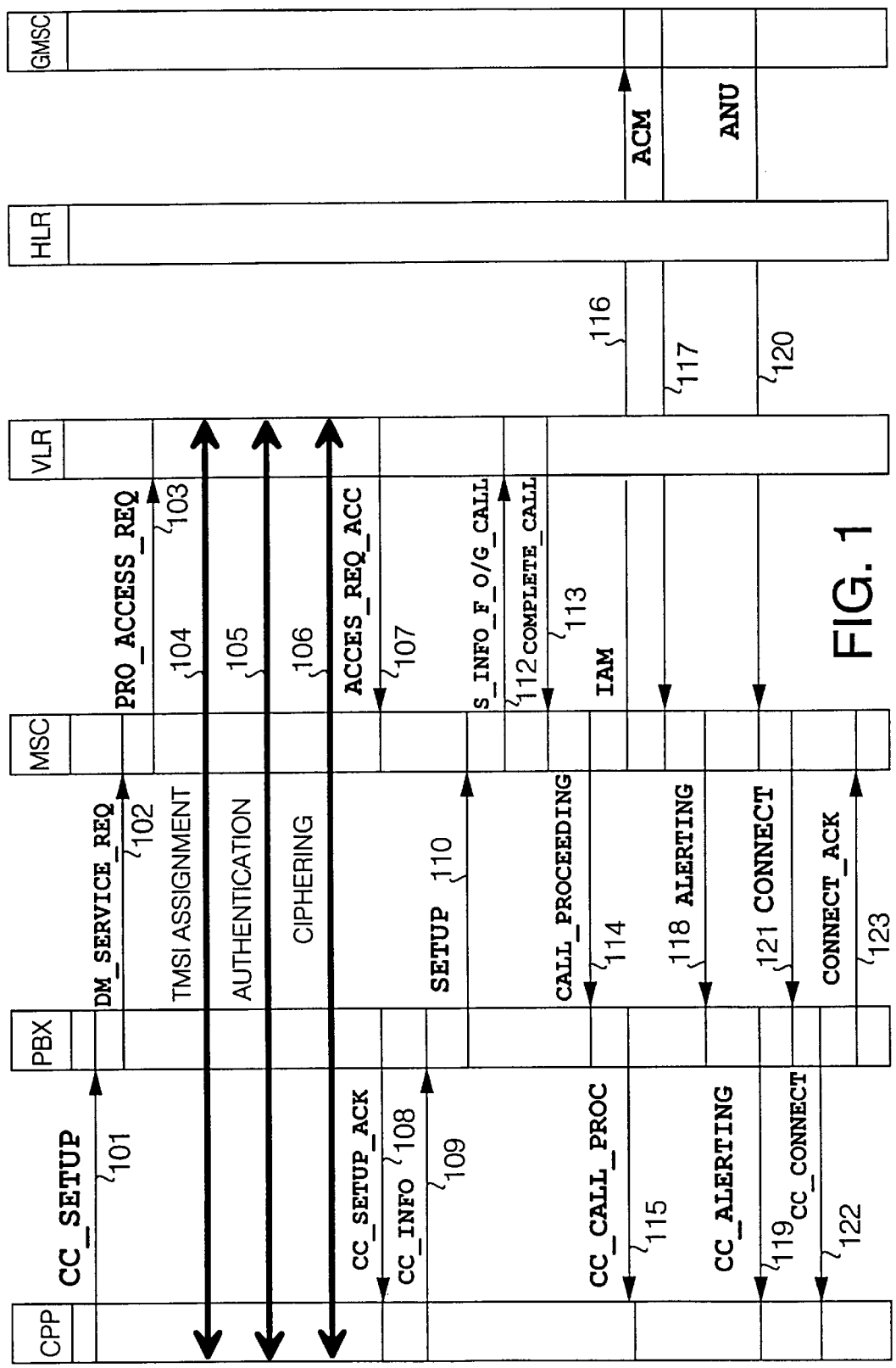
FIG. 1 is a signalling diagram of prior art connection establishment.

FIG. 2 is a signalling diagram of connection establishment according to the invention. A subscriber CPP (Cordless Portable Part) located within the service area of the private branch exchange PBX sends 101 a connection establishment request CC_SETUP, by way of which the subscriber CPP requests the PBX to establish a connection to another subscriber. Having received the connection establishment request CC_SETUP, the PBX checks whether the subscriber is a home subscriber in said PBX, that is, whether the subscriber's identifier is included in the home subscriber register of the PBX. The PBX comprises means for maintaining this database and for performing the necessary reference operations, i.e. checking to determine whether the subscriber is located within the service area of its home PBX. If the subscriber is located within the service area of its own home PBX, i.e. if the PBX is the subscriber's home PBX, the PBX initiates assignment 201 of a temporary user identification TPUI for the subscriber. The TPUI may correspond to a TMSI in the GSM network. Thereafter the PBX performs authentication 202 of the subscriber. Further, the PBX activates 203 a ciphering procedure. If the subscriber in the PBX is a DECT subscriber, the mobility management functions, i.e. the paging, authentication, ciphering and TPUI assignment, are performed in accordance with the DECT standard "European Telecommunication Standard ETS 300 175-5: Radio Equipment and Systems. Digital European Cordless Telecommunications Common Interface, Part 5: Network layer". Upon completion of these operations, the PBX acknowledges the CC_SETUP message to the subscriber by sending 108 a CC_SETUP_ACK message, giving the subscriber an indication to send 109 a message CC_INFO containing the telephone number of the B-subscriber to the PBX. Thereafter the PBX sends 204 a connection establishment request in accordance with the invention as a SETUP message to the mobile services switching centre, instead of the PBX sending a service request, i.e. a DM_SERVICE_REQ message, in accordance with the prior art. The mobile services switching centre now detects from the connection establishment request 204 received as a first message from the PBX that it is to employ the inventive optimized signalling. In accordance with optimized signalling, the mobile telephone network then omits the procedures according to the prior art, i.e. the TMSI assignment 104, authentication 105 and ciphering 106. Instead of performing these operations, the mobile services switching centre sends 205 a CALL_PROCEEDING message directly to the PBX, whereby the unnecessary TMSI assignment 104, authentication 105 and ciphering 106 procedures are omitted. Likewise, the access request 103 pertaining to mobility management which is sent by the mobile services switching centre to the visitor location register, i.e. PROC_ACCESS_REQ, and the acknowledgement 107 sent by the visitor location register to that message, i.e. ACCESS_REQ_ACC message, are omitted. Thereafter the call establishment according to the invention proceeds as shown in FIG. 1, i.e. steps 115, 116, 117, 118, 119, 120, 121, 122 and 123 are performed.

The drawings and the description pertaining thereto are only intended to illustrate the inventive concept. The call establishment method according to the invention may vary in its details within the scope of the claims. Whilst the invention has been described in the above mainly in terms of GSM, the invention is also applicable to other kinds of mobile telephone systems.

I claim:
1. A method for call establishment in a cellular radio system comprising a mobile services switching centre (MSC) and a private branch exchange (PBX) connected thereto, and a visitor location register (VLR) for storing subscriber data on subscribers (CPP) located within the service area of the mobile services switching centre, the method being characterized in that when the private branch exchange (PBX) receives a connection establishment request (101) from a subscriber (CPP) located within its service area, it checks whether the private branch exchange (PBX) is the home private branch exchange of the subscriber (CPP) that sent the connection establishment request;

if the private branch exchange is the home private branch exchange of the subscriber, the private branch exchange performs independently authentication (202), activation of ciphering procedures (203) and assignment (201) of a temporary subscriber identity and only thereafter sends a connection establishment request (204) to the mobile services switching center;

if the first call-related message sent by the private branch exchange (PBX) to the mobile services switching center (MSC) is a connection establishment request (204) instead of a service request (102), the mobile services switching centre initiates (205) connection establishment (115, 116, 117, 119, 120, 121, 122, 123) without an interrogation (103) to the visitor location register.

2. The method for call establishment of claim 1, characterized in that if the private branch exchange (PBX) is not the home private branch exchange of the subscriber;

sending from the mobile services switching centre an access request pertaining to mobility management to the visitor location register if the first message from the private branch exchange is a service request;

the visitor location register initiating assignment of a temporary subscriber identity, the visitor location register performing authentication, and the visitor location register initiating ciphering procedures for the call to be established;

the visitor location register acknowledging the access request pertaining to mobility management to the mobile services switching center;

the private branch exchange acknowledging the connection establishment request received from the subscriber;

the subscriber sending the telephone numbers necessary for establishing the call;

the private branch exchange sending a connection establishment request to the mobile services switching center;

the mobile services switching centre sending an interrogation to the visitor location register;

the visitor location register checking the subscriber data of the subscriber and sending an acknowledgement to the mobile services switching center;

the mobile services switching centre initiating connection establishment;

establishing a connection between the subscriber and the mobile services switching center.

home private branch exchange of the subscriber (CPP), the private branch exchange sends a service request (102) as a first message to the mobile services switching centre;

if the first message from the private branch exchange is a service request (102), the mobile services switching centre (MSC) sends an access request (103) pertaining to mobility management to the visitor location register (VLR);

the visitor location register (VLR) initiates assignment (201) of a temporary subscriber identity, performs authentication (202) and initiates ciphering procedures (203) for the call to be established;

the visitor location register (VLR) acknowledges (107) the access request (103) pertaining to mobility management to the mobile services switching centre (MSC);

the private branch exchange (PBX) acknowledges (108) the connection establishment request (101) received from the subscriber (CPP);

the subscriber (CPP) sends (109) the telephone numbers necessary for establishing the call;

the private branch exchange (PBX) sends a connection establishment request (110) to the mobile services switching centre;

the mobile services switching centre sends (112) an interrogation to the visitor location register (VLR);

the visitor location register checks the subscriber data of the subscriber and sends (113) an acknowledgement to the mobile services switching centre (MSC);

the mobile services switching centre (MSC) initiates (114) connection establishment;

a connection is established (115, 116, 117, 119, 120, 121, 122, 123) between the subscriber and the mobile services switching centre.

3. A method for call establishment in a cellular radio system, the method comprising the steps of:

providing a mobile services switching centre and a private branch exchange connected thereto, and a visitor location register for storing subscriber data on subscribers located within a service area of the mobile services switching center;

maintaining a subscriber register at the private branch exchange for those of the subscribers from whom the private branch exchange is a home private branch exchange;

the private branch exchange receiving a connection establishment request from a subscriber located within the service area of the private branch exchange;

in response to reception by said private branch exchange of said connection establishment request checking in the private branch exchange whether the private branch exchange is the home private branch exchange of the subscriber which sent the connection establishment request;

in response to said checking, if the private branch exchange is the home private branch exchange of the subscriber, independently performing in the private branch exchange an authentication, an activation of ciphering procedures and an assignment of a temporary subscriber identity to the subscriber and only thereafter sending from the private branch exchange a connection establishment request to the mobile services switching centre as a first call-related message; and in response to reception by said mobile services switching center of said connection establishment request initiating in the mobile services switching center a connection establishment without making an interrogation to the visitor location register if the first call-related message sent by the private branch exchange to the mobile services switching centre is a connection establishment request instead of a service request.

4. The method for call establishment of claim 3, comprising the steps of:

sending from the private branch exchange a service request as a first call-related message to the mobile services switching centre if the private branch exchange which has received said connection establishment request from the subscriber is not the home private branch exchange of the subscriber;

sending from the mobile services switching centre an access request pertaining to mobility management to the visitor location register if the first call-related message from the private branch exchange is a service request;

the visitor location register initiating an assignment of a temporary subscriber identity, the visitor location register performing an authentication, and the visitor location register initiating ciphering procedures for the call to be established;

the visitor location register acknowledging the access request pertaining to mobility management to the mobile services switching center;

the private branch exchange acknowledging the connection establishment request received from the subscriber;

the subscriber sending the telephone numbers necessary for establishing the call;

the private branch exchange sending the connection establishment request to the mobile services switching centre;

the mobile services switching centre sending an interrogation to the visitor location register;

the visitor location register checking the subscriber data of the subscriber and sending an acknowledgement to the mobile services switching centre;

the mobile services switching and centre initiating a connection establishment; and establishing a connection between the subscriber and the mobile services switching centre.

* * * * *